United States Patent [19]

Manor et al.

[11] Patent Number: 4,720,965
[45] Date of Patent: Jan. 26, 1988

[54] EQUIPMENT FOR PRODUCING COMPACTED WAFERS FROM PLANTS AND STALKS

[75] Inventors: Gedalyahu Manor; Dan Wolf, both of Haifa, Israel

[73] Assignee: Technion Research & Development Foundation Ltd., Haifa, Israel

[21] Appl. No.: 854,545

[22] Filed: Apr. 22, 1986

[30] Foreign Application Priority Data

May 20, 1985 [IL] Israel ............................. 75234

[51] Int. Cl.$^4$ ........................................ A01P 45/02
[52] U.S. Cl. ........................................ 36/95; 56/502
[58] Field of Search ............... 56/95, 500, 502; 171/50, 55, 57; 172/27, 28

[56] References Cited

U.S. PATENT DOCUMENTS

| | | | |
|---|---|---|---|
| 1,862,399 | 6/1932 | Hannah | 171/57 |
| 3,664,098 | 5/1972 | Thor | 56/502 |

Primary Examiner—Stephen J. Novosad
Assistant Examiner—William P. Neuder
Attorney, Agent, or Firm—Frishauf, Holtz, Goodman & Woodward

[57] ABSTRACT

A device for attachment to an uprooting implement is designed for compacting plant residue into cylindrical or rope-like shape and to cut the compacted cylinder into short wafers. The device comprises four rollers in parallel alignment symmetrically positioned around a central space defining the compacted cylinder, and urged toward the central space by springs. The rollers are positioned with their axes in the direction of travel of the uprooting implement and all are rotated in the same sense of rotation. Each roller has a cylindrical rear portion and a frusto-conical front portion provided with a broadthreaded screw, the screws serving to press the plant residue into the space between the cylindrical roller portions. Conveyor means are provided for feeding the plants into the compacting device, and cutting means are provided to the rear of the rollers.

18 Claims, 6 Drawing Figures

EQUIPMENT FOR PRODUCING COMPACTED WAFERS FROM PLANTS AND STALKS

BACKGROUND OF THE INVENTION

The invention relates to agricultural equipment suitable for gathering plants and stalks, compacting them into rope- or sausage-shape and cutting the rope or sausage into wafers of a predetermined thickness and length.

It has long been proposed to compress green or dried forage, such as maize, alfalfa, or sorghum, into compact lumps in order to save storage space and to make it easy to handle while using it as cattle fodder. This method is preferable to storing and feeding green or dried fodder in loose bulk, and, incidentally, it is well known that cattle prefer hard wafers to loose, finely comminuted forage.

It has been tried in the past to compress forage as hay—after its cutting, drying, and collecting, by mechanical equipment—between rotating rollers which were arranged in the implement with the rollers positioned at right angles to the direction of travel of the equipment; however, the results were poor, the hay was not sufficiently compacted, and the energy requirement was too high. As a result implements of this kind were not adapted for general use.

One should distinguish between two different purposes for uprooting, cutting and compacting plant parts: there is, in the first place, cattle forage which is, at present, cut, dried and stored as bales, or in natural shape, and, secondly, there are stalks and roots of plants left in the field after the crop has been gathered, which are uprooted and generally used as fertilizers for the next crop.

Hay is collected by forage combines which comprise cutters and elevator means for transporting the cut plants into storage bins which travel together with the equipment. The latter are exchanged for empty containers as soon as they are filled. It is a fact that, instead of storing the loose material, it is time- and space-saving to store densely compacted, relatively small lumps of hay which are easily digested by the cattle.

Equipment for recycling cotton stock or other roots and stalks, comprises rotating rollers, wheels, and/or fast travelling rubber belts serving to extract the plant from the soil, conveyors for lifting the uprooted material into a shredder where they are finely chopped, and means for conveying the shredded material into storage bins or for spreading them on the ground. These machines are heavy and rather unwieldy, while their energy requirements, especially those of the shredders, are very high.

For these reasons it is the object of the present invention to provide a plant-compacting device which can be attached to, or mounted on, conventional—or specially constructed - agricultural equipment such as forage harvesters or cotton stock uprooters, which should compact the uprooted or cut plant parts into cylindrical rope- or sausage-shape and cut the resulting cylinder into discs or wafers of a required length.

It is another object to provide such equipment at low cost, and it is a further, very important object that the equipment should produce the wafers as an end product with a low energy consumption.

SUMMARY OF THE INVENTION

The compacting device of the present invention consists of an attachment to an agricultural plant-cutting or an uprooting implement. It comprises at least three rollers positioned with their axes substantially parallel to the direction of travel and rotating unidirectionally. The at least three rollers are either in parallel alignment or their axis converge slightly towards the rear, the purpose of which will be explained at a later stage. Each roller comprises a cylindrical rear portion and a frustoconical front portion, the surface of the conical portion being provided with a broad-threaded screw having an outer diameter commensurate with the diameter of the cylindrical portion. The rollers are urged towards each other by springs or similar elastic means.

A preferred embodiment of the device comprises four rollers symmetrically postioned around the axis of the compacted sausage to be produced; each two rollers are rotatably fastened to the ends of a pair of swingable arms which are pivotally attached to a rigid frame, preferably two adjoining arms being pivotally attached to one common pivot each, on opposite sides of frame. The rollers are driven by a common chain drive which obtains its motion from a sprocket coupled to the power-take-off of the engine driving the cutting or uprooting implement. Spiral springs attached to the ends of two adjacent arms swinging about the same pivot, pull the rollers towards each other and towards the center.

The twigs, roots and trunks of the cut or uprooted plants are directed into the center of the compacting device between the rollers, are gripped by the screws on the frustoconical front portions and drawn along these front portions into the space between the cylindrical portions which serve to compact the plant parts into a sausage-like form. The cylindrical portions converge slightly towards the rear, whereby their rotation imparts further rearward motion to the compacted sausage or rope.

A cutting device in the form of a guillotine knife or a rotating disc knife is positioned to the rear of the rollers and is adapted to cut the compacted material into wafers of the required length.

In accordance with their intended use the wafers are either conveyed into containers for storage and subsequent use as fodder, or they are buried underground to serve as fertilizer. The latter operation is preferably carried out by attaching a plough-shaped implement to the rear of the cutting tool, which is adapted to open a rut in the soil into which the wafers are dropped and subsequently buried.

Figure 1:
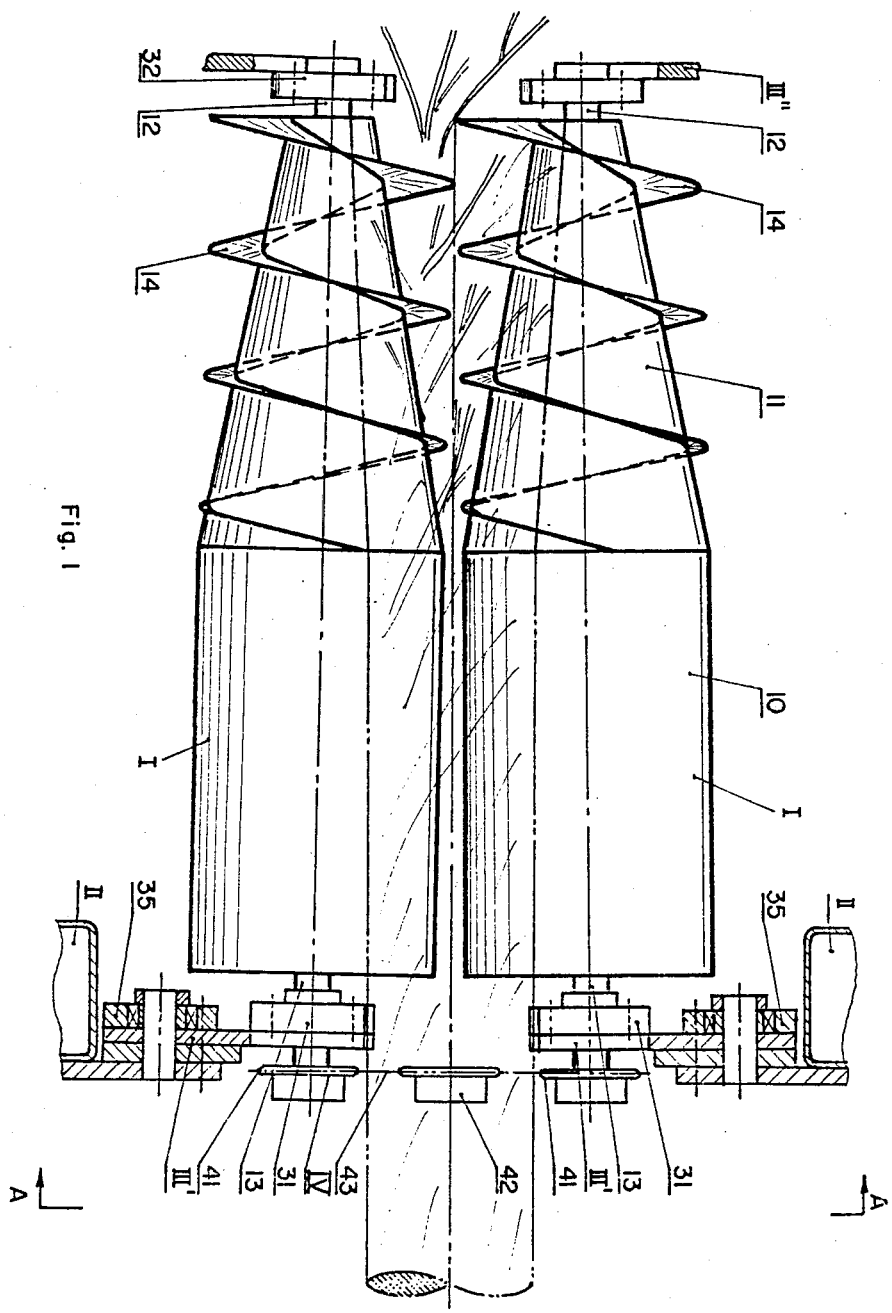
FIG. 1 is a top view and part horizontal section of a compacting device according to the invention.
Figure 2:
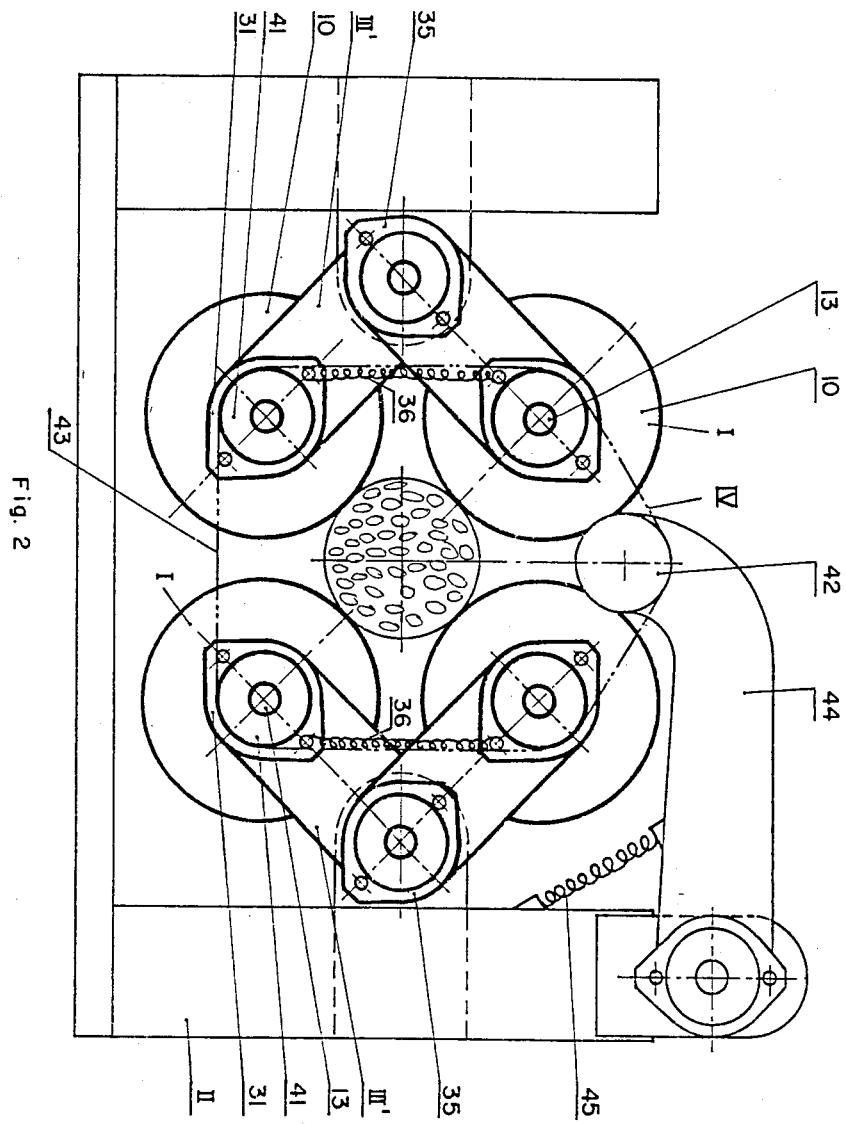
FIG. 2 is an end view of the device shown in FIG. 1, along the line A—A.

DESCRIPTION OF PREFERRED EMBODIMENTS:

With reference to FIGS. 1 and 2 of the drawings:-a compacting device comprises four rollers 1 rotatably and oscillatingly fastened in a U-shaped rigid frame II by means of eight pivoted arms III', III" and driven by a chain-drive IV. EAch roller comprises of a cylindrical rear portion 10 and a frustoconical front portion 11, a front axle 12 and a rear axle 13. A broad-threaded screw 14 protrudes out of the front portion, its outer diameter being substantially uniform and equal to the outer diameter of the cylindrical rear portion. The rollers I are rotatably positioned in bearings 31 and 32 attached to the ends of the pivoted arms III' and III". Sprocket wheels 41 are mounted on the rear ends of the rear axles 13 of the rollers, which protrude to the rear beyond the bearings 31, and drive the rollers in uniform sense of rotation by means of a chain 43 and a fifth sprocket wheel 42, the latter being attached to the outer end of a bracket 44 pivotally connected to the frame II and urged outwardly by the force of a compression spring 45. The sprocket wheel 42 is connected to the power-take-off of the engine propelling the implement to which the compacting device is attached.

The arms III' and III" are pivotally connected to the upstanding members of the U-shaped frame II (shown in respect of the rear arms III' only in FIG. 2) by means of bearings 35, two adjacent arms each in one bearing, extending therefrom in V-formation. The two arms each swinging about one pivot as defined by the bearings 35, are urged towards each other and to the center of the device by two spiral springs 36.

Twigs and stems of plants are drawn into the device by the screw blades 14, are gradually compacted between the conical front portions 11, and brought into cylindrical shape between the cylindrical portions 10. The slightly diverging alignment of the roller axes assists in propelling the sausage or rope in the rearward direction.

Figure 3:
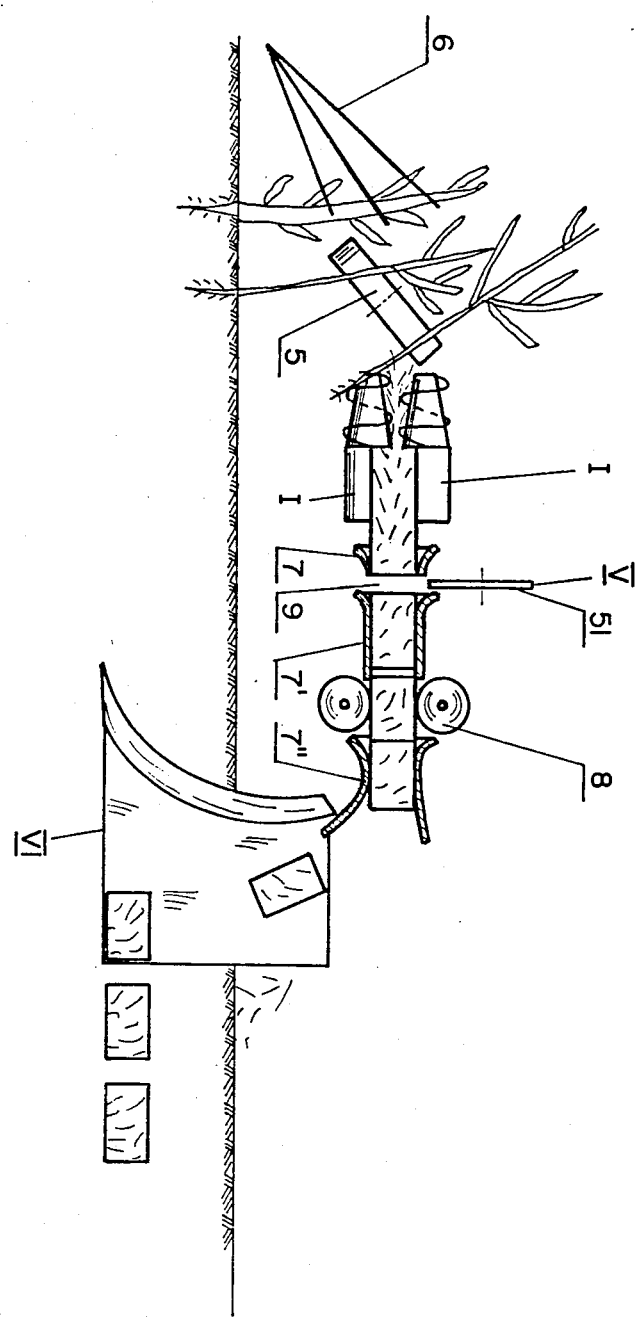
FIG. 3 is a diagrammatic side elevation of a compacting device attached to a stalk-uprooting implement, including an implement serving to bury the produced wafer in the soil.
Figure 4:
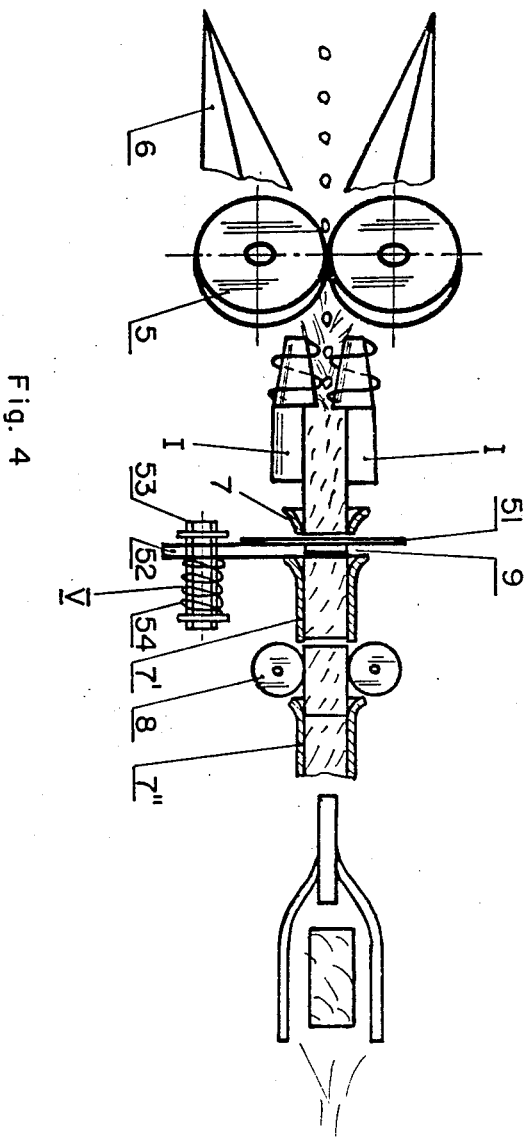
FIG. 4 is a plan view of the implement and device shown in FIG. 3

FIGS. 3 and 4 illustrate the device shown in FIGS. 1 and 2 mounted on a stalk-extracting implement, of which only two rotating tyred wheels 5 and two front guides 6 are shown in the drawing. In a known manner the two wheels 5 are urged towards each other, and the plants are pulled out of the soil by being clamped between their resilient peripheral surfaces. The front guides 6 serve, also in a known manner, to guide and direct the extracted plants into the center between the wheels 5. The stalks, after having been extracted, are directed towards the central space between the four rotating rollers I and are compacted into sausage shape as described with reference to FIGS. 1 and 2. The compacted material is guided to the rear of the implement inside tubular guides 7, 7' and 7", and moved along them by rotating pusher wheels 8. A cutting device V is adapted to cut the sausage into short pieces of wafers by being intermittendly inserted into, and retracted out of, a gap 9 left between the tubular guides 7 and 7'. The cutting device comprises of a fast-rotating disc-saw 51 which is attached to a swinging arm 52 adapted to oscillate about a horizontal axle 53. The saw 51 is allowed a certain longitudinal motion along the axle 53 by a spiral spring 54, this motion being necessary to adapt the position of the cutter to the progress of the sausage along the guides 7 during the actual cutting operation.

A twin plow share VI (see FIG. 3) is attached to the rear portion of the stalk-extracting implement and is pulled thereby through an upper soil layer resulting in a rut in the ground. The tubular guide 7" is shaped to form a spout at its rear end through which the cut wafers drop into the rut and are covered by the soil falling back after the plowshare has passed through.

Figure 5:
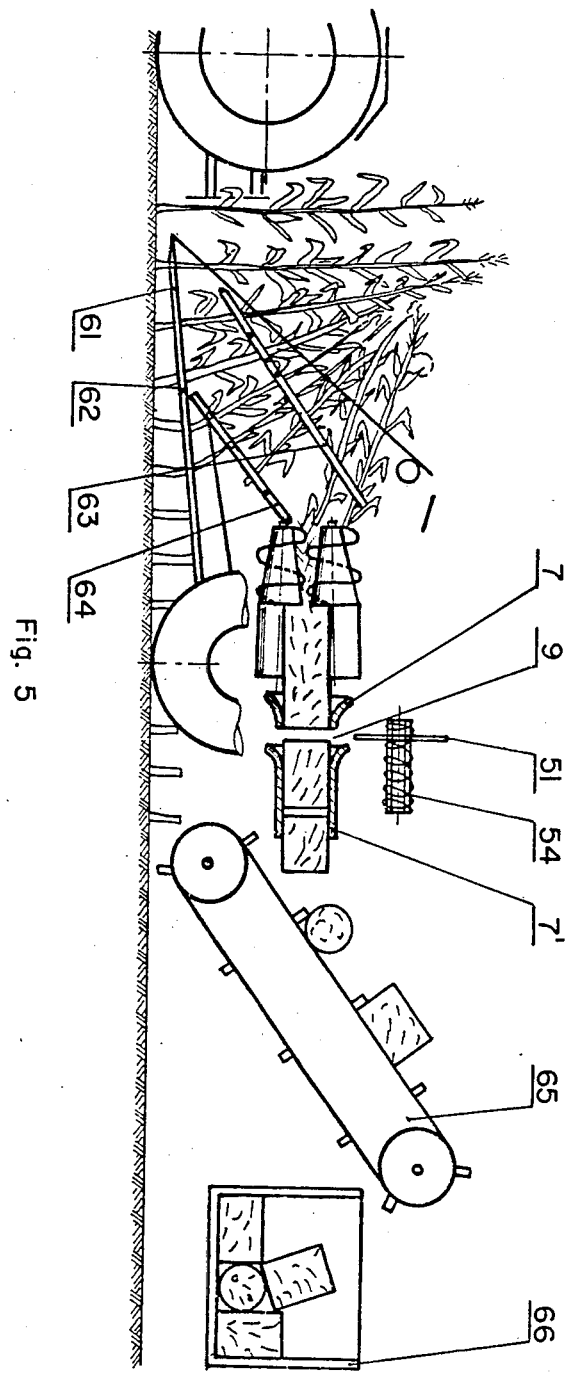
FIG. 5 is a diagrammatic elevation of a compacting device attached to a plant-cutting and harvesting implement, including a conveyor serving to convey the cut wafers into a container.
Figure 6:
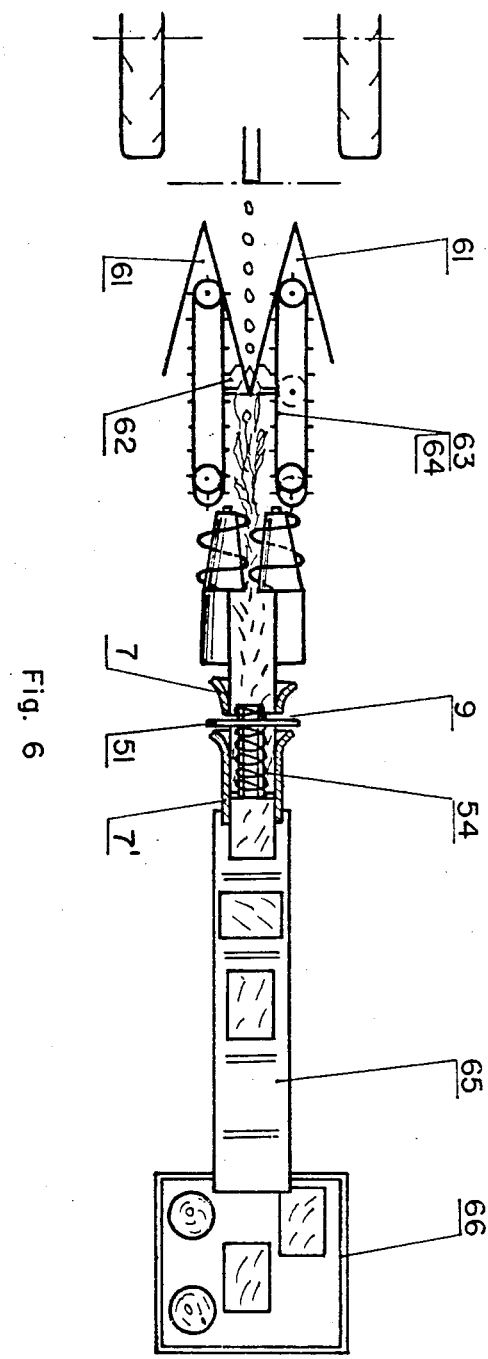
FIG. 6 is a top view of the implement and the compacting device shown in FIG. 5.

FIGS. 5 and 6 illustrate the mounting of a compacting device to the rear of a forage harvester drawn by a tractor. The harvester comprises two front guides 61 adapted to direct the plants into the knives of a cutter 62, two upper chain conveyors 63 and two lower chain converyors 64, the latter serving to direct the cut plants—in the present drawing maize plants—into the central opening between the four rollers I of the compacting device. The compacted forage is cut into wafers by a rotating disc saw 51 which is adapted to be moved in and out of the gap 9 between a frontal tubular guide 7 and a rear tubular guide 7', the saw being permitted to move longitudinally together with the extruded and compacted sausage, and to return to its initial position by means of a spiral spring 54. The cut-off wafers drop onto a band-conveyor 65 which takes them to its top end and drops them off into a container 66.

It is reiterated that the drawings represent only the essential parts of the various implements without showing the framework on which they are mounted or the driving mechanism, in order not to obstruct the view of the working parts and in order to clearly show their operation.

It will be understood that the compacting device and its variagated applications may undergo variations and modifications at the hands of a person skilled in the art, within the spirit of the invention and the scope of the appended Claims.

It is, for instance, proposed to replace the chain drive IV by a belt drive.

As an alternative for the spiral springs 36 serving to pull the rollers towards each other, compression springs may be employed which would serve to push the arms III', III" towards the centre and onto the plants to be compacted.

The rigid frame, instead of being in U-shape as shown, may be of any other configuration, as for instance semicircular or circular.

We claim:

1. A plant-compacting device adapted for attachment to a movable agricultural plant-cutting or stalk-uprooting implement, for compacting cut or uprooted plant parts into generally cylindrical rope- or sausage-shape compacted plant material, and for cutting said compacted plant material into disc-shaped wafers, the plant-compacting device having a front area for receiving said cut or uprooted plant parts, and a rear area for delivering said wafers, the plant-compacting device further comprising:
    frame means;
    at least three elongated rollers mounted on said frame means adjacent or at said front area of the plant-compacting device, each roller having a longitudinal axis, said rollers being positioned with their longitudinal axes generally parallel to the direction of movement of said plant-cutting or stalk-uprooting implement, and a central space being defined between said rollers, said central space defining the intended diameter of said compacted plant material; each of said rollers comprising:
    a substantially cylindrical rear portion;

a substantially frusto-conical front portion, said front portion having a broad-threaded screw attached to its substantially conical outer surface, the outer diameter of said screw being substantially commensurate with the diameter of said rear portion;

a front axle extending from said front portion; and a rear axle extending from said rear portion;

said front and rear axles being coupled to said frame by means of respective bearings so that said rollers are rotatably mounted by their respective axles;

means for rotating said at least three rollers in the same direction of rotation;

said cut or uprooted plant parts being received at the front area of said plant-compacting device and being fed into said central space between said rollers;

elastic means for urging said rollers towards said central space, so as to exert pressure on cut or uprooted plant parts which are guided into said central space between said rollers to be compacted into said rope- or sausage-shape compacted plant material; and cutting means arranged at the rear of said rollers for cutting said compacted plant material into wafers of a predetermined length.

2. The plant-compacting device of claim 1, comprising four of said rollers symmetrically arranged with respect to said central space between said rollers.

3. The plant-compacting device of claim 2, wherein said four rollers having their longitudinal axes in substantially parallel alignment.

4. The plant-compacting device of claim 2, wherein said four rollers have their longitudinal axes slightly converging toward the rear area of said device.

5. The plant-compacting device of claim 2, wherein said front axles of each said rollers are rotatably positioned in a bearing each attached to an end of a respective front arm, and said rear axles of each of said rollers are rotatably positioned in a bearing each attached to an end of a respective rear arm, each of said arms being pivotally attached at its other end to said frame means of said device.

6. The plant-compacting device of claim 5, comprising four of said front arms arranged in two pairs, each pair of said front arms being attached to a common pivot on said frame means.

7. The plant-compacting device of claim 6, comprising four of said rear arms arranged in two pairs, each pair of said rear arms being attached to a common pivot on said frame means.

8. The plant-compacting device of claim 5, comprising four of said rear arms arranged in two pairs, each pair of said rear arms being attached to a common pivot on said frame means.

9. The plant-compacting device of claim 7, wherein the two arms of each respective pair of arms attached to one common pivot on said frame means are interconnected by a spring means attached to the ends of said arms proximate said axles of said rollers.

10. The plant-compacting device of claim 9, wherein said spring means comprises a spiral spring.

11. The plant-compacting device of claim 2, further comprising tubular guide means positioned to the rear of said rollers, said tubular guide means being arranged substantially horizontal and substantially concentric with said central space between said rollers for guiding said compacted plant material after it leaves said central space.

12. The plant-compacting device of claim 11, wherein said tubular guide means comprises at least two tubular members spaced apart in the direction of the axis of said central space, thereby leaving a gap between said at least two tubular members.

13. The plant-compacting device of claim 12, wherein said cutting means comprises a cutting member and means for inserting said cutting member into said gap between said tubular members and for withdrawing said cutting member after having cut said compacted plant material into wafers.

14. The plant-compacting device of claim 13, wherein said cutting means includes support means for said cutting member, said support means including means for permitting said cutting member to be movable within said gap between said tubular members in the direction of the axis of said central space during cutting of said compacted plant material into wafers.

15. The plant-compacting device of claim 1, further comprising a plowshare attached to the rear area of said compacting device for opening a rut in the soil, and means for dropping said cut wafers into said rut.

16. The plant-compacting device of claim 1, further comprising conveyor means attached to the rear area of said compacting device for conveying said cut wafers into storage containers.

17. The plant-compacting device of claim 1, further comprising discharge means for discharging said cut wafers from the plant-compacting device.

18. The plant-compacting device of claim 17, wherein said discharging means is located rearward of said rollers and of said cutting means.

* * * * *